United States Patent
Yu et al.

(10) Patent No.: US 10,843,784 B2
(45) Date of Patent: Nov. 24, 2020

(54) HYDROGEN RECYCLING FLIGHT SYSTEM AND FLIGHT METHOD

(71) Applicant: UNIVERSITY OF SEOUL INDUSTRY COOPERATION FOUNDATION, Seoul (KR)

(72) Inventors: Byung Deok Yu, Seoul (KR); Hyunsoo Min, Seoul (KR); Junjin Jeon, Gwangju-si (KR)

(73) Assignee: UNIVERSITY OF SEOUL INDUSTRY COOPERATION FOUNDATION, Seoul (KR)

( * ) Notice: Subject to any disclaimer, the term of this patent is extended or adjusted under 35 U.S.C. 154(b) by 395 days.

(21) Appl. No.: 15/758,870

(22) PCT Filed: Dec. 3, 2015

(86) PCT No.: PCT/KR2015/013121
§ 371 (c)(1),
(2) Date: Mar. 9, 2018

(87) PCT Pub. No.: WO2017/069331
PCT Pub. Date: Apr. 27, 2017

(65) Prior Publication Data
US 2018/0290720 A1    Oct. 11, 2018

(30) Foreign Application Priority Data

Oct. 22, 2015 (KR) .......................... 10-2015-0147616

(51) Int. Cl.
*B64B 1/24* (2006.01)
*H02S 20/30* (2014.01)
(Continued)

(52) U.S. Cl.
CPC .................. *B64B 1/24* (2013.01); *B64B 1/00* (2013.01); *B64B 1/20* (2013.01); *B64B 1/36* (2013.01);
(Continued)

(58) Field of Classification Search
CPC ... B64B 1/24; B64B 1/58; H02S 20/30; H02S 10/20; B64D 2041/005; C25B 1/04; Y02E 60/32; Y02T 90/40
(Continued)

(56) References Cited

U.S. PATENT DOCUMENTS 9,327,818 B1 * 5/2016 Roach ........................ B64B 1/40
9,511,844 B1 * 12/2016 DeVaul ....................... B64B 1/44
(Continued)

FOREIGN PATENT DOCUMENTS

| JP | 2002-255096 | 9/2002 |
| KR | 10-2014-0115910 | 10/2014 |
| KR | 10-2015-0023193 | 3/2015 |

*Primary Examiner* — Christopher P Ellis
(74) *Attorney, Agent, or Firm* — Lex IP Meister, PLLC

(57) ABSTRACT

The present invention relates to a hydrogen recycling flight system and flight method, the hydrogen recycling flight system including: a flight fuselage which has at least one pair of wings at each of both sides of a body; a hydrogen gas balloon which is air-tightly connected to the flight fuselage; a hydrogen fuel cell which is connected with the hydrogen gas balloon and is installed outside or inside the flight fuselage; and a secondary battery which is charged with electricity generated from the hydrogen fuel cell, electricity generated from a solar cell provided at an outer peripheral portion of the flight fuselage, or electricity of an external power network, in which by using a switch, the hydrogen fuel cell is switched to a water electrolysis device or the water electrolysis device is switched to the hydrogen fuel cell, the hydrogen recycling flight system includes: a water tank which stores water generated from the hydrogen fuel
(Continued)

cell; the water electrolysis device which electrolyzes the stored water; a switch control device which switches functions of the hydrogen fuel cell and the water electrolysis device; and a high-pressure gas barrel which high-pressure stores hydrogen gas and oxygen gas generated in the water electrolysis device, and the flight fuselage flies by controlling the volume of the hydrogen gas balloon that is flotation power of a flight vehicle by an operation of the hydrogen fuel cell or the high-pressure gas barrel.

13 Claims, 5 Drawing Sheets

(51) Int. Cl.
| | | |
|---|---|---|
| H02S 10/10 | (2014.01) | |
| B64B 1/64 | (2006.01) | |
| C25B 15/02 | (2006.01) | |
| B64B 1/00 | (2006.01) | |
| H02J 15/00 | (2006.01) | |
| H01M 8/04082 | (2016.01) | |
| B64D 27/24 | (2006.01) | |
| B64B 1/62 | (2006.01) | |
| B64B 1/36 | (2006.01) | |
| B64D 41/00 | (2006.01) | |
| H02S 10/20 | (2014.01) | |
| B64B 1/20 | (2006.01) | |
| B64D 9/00 | (2006.01) | |
| C25B 1/04 | (2006.01) | |
| H01M 8/0432 | (2016.01) | |
| H01M 8/0438 | (2016.01) | |
| H01M 8/04746 | (2016.01) | |
| H01M 8/0656 | (2016.01) | |
| H01M 10/46 | (2006.01) | |
| H01M 16/00 | (2006.01) | |
| H02J 7/34 | (2006.01) | |
| H02J 7/35 | (2006.01) | |
| H01M 8/04119 | (2016.01) | |

(52) U.S. Cl.
CPC .............. *B64B 1/62* (2013.01); *B64B 1/64* (2013.01); *B64D 9/00* (2013.01); *B64D 27/24* (2013.01); *B64D 41/00* (2013.01); *C25B 1/04* (2013.01); *C25B 15/02* (2013.01); *H01M 8/0432* (2013.01); *H01M 8/0438* (2013.01); *H01M 8/04208* (2013.01); *H01M 8/04776* (2013.01); *H01M 8/0656* (2013.01); *H01M 10/465* (2013.01); *H01M 16/006* (2013.01); *H02J 7/34* (2013.01); *H02J 7/35* (2013.01); *H02J 15/00* (2013.01); *H02S 10/10* (2014.12); *H02S 10/20* (2014.12); *H02S 20/30* (2014.12); *B64B 2201/00* (2013.01); *B64B 2211/00* (2013.01); *B64D 2221/00* (2013.01); *H01M 8/04156* (2013.01); *H01M 2220/20* (2013.01); *H01M 2250/20* (2013.01); *H01M 2250/402* (2013.01); *Y02B 90/10* (2013.01); *Y02E 60/32* (2013.01); *Y02E 60/36* (2013.01); *Y02E 60/50* (2013.01); *Y02P 20/129* (2015.11); *Y02T 90/40* (2013.01)

(58) Field of Classification Search
USPC .......................................................... 244/25
See application file for complete search history.

(56) References Cited

U.S. PATENT DOCUMENTS

| | | | |
|---|---|---|---|
| 10,399,400 B2 * | 9/2019 | Hartshorn | B63G 8/001 |
| 2007/0278344 A1 | 12/2007 | Zubrin et al. | |
| 2008/0185475 A1 | 8/2008 | Fuller | |
| 2009/0032648 A1 | 2/2009 | Pearson | |
| 2013/0037650 A1 * | 2/2013 | Heppe | B64B 1/54 |
| | | | 244/2 |
| 2014/0252156 A1 * | 9/2014 | Hiebl | B64C 39/024 |
| | | | 244/3 |
| 2014/0352801 A1 * | 12/2014 | McAlister | B60K 15/035 |
| | | | 137/312 |
| 2017/0073058 A1 * | 3/2017 | Fournier | C25B 1/003 |
| 2018/0050300 A1 * | 2/2018 | Rheaume | A62C 99/0018 |
| 2018/0109223 A1 * | 4/2018 | Panas | H02S 10/40 |
| 2018/0290720 A1 * | 10/2018 | Yu | H01M 8/0432 |
| 2018/0319477 A1 * | 11/2018 | Yakub | B64D 41/00 |
| 2019/0077510 A1 * | 3/2019 | Panas | B64C 39/024 |

* cited by examiner

HYDROGEN RECYCLING FLIGHT SYSTEM AND FLIGHT METHOD

TECHNICAL FIELD

The present invention relates to a hydrogen recycling flight system, and more particularly, to a hydrogen recycling flight system, in which a hydrogen fuel cell is combined to be linked with a water electrolysis device, hydrogen gas generated by the water electrolysis is used as flotation power of a flight vehicle or used as fuel of the hydrogen fuel cell to generate electricity, the generated electricity is used in the water electrolysis device, and the hydrogen gas used as the flotation power of the flight vehicle is controlled to be used as fuel of the hydrogen fuel cell, thereby increasing flight time and making the flight vehicle floating in the air with hydrogen gas glide by using gravity of the flight vehicle as thrust.

BACKGROUND ART

Recently, Amazon which ranks the largest share in the online shopping mall market within the U.S. presents a system in which an unmanned flight vehicle loads a parcel delivery box, flies about 20 km, makes a delivery of the parcel delivery box to a predesignated address, and then returns.

With the development of the unmanned flight vehicle technology, the unmanned flight vehicle will also be widely used for other purposes, in addition to the delivery purpose.

An expected field in which the unmanned flight vehicle is most widely used is a field of exploring for forested or rural areas, which is difficult for people to reach or private and military fields for monitoring a dangerous region in which a war and terror are generated.

The unmanned flight vehicle may be combined with a robot technology to repair an outer wall of a high-rise building, rescue people when a disaster in a mountainous area occur, and monitor and repair an oil pipeline and a gas pipeline of which robbery and damage are often while flying over the oil pipeline and the gas pipeline for 24 hours.

The unmanned flight vehicle shows a quick movement beyond a person's imagination, and even when several flight vehicles fly, the flight vehicles are capable of fluidly flying without bumped into each other, so that the unmanned flight vehicle is usable as a means for rapidly moving people in a disaster/accident situation, such as a tsunami.

However, the existing unmanned flight vehicle uses 4 to 12 motors having a small capacity for flight and rotates a rotary wing belonging to each motor, and in this case, when a weight including the mass of an airplane itself is 80 kg or more, there is a problem in that the flight vehicle cannot fly due to the large weight of the flight vehicle.

Further, when a standard and an output of a motor is increased for increasing the output of the motor, a large-capacity battery having a large weight (for example, a battery weighing 10 to 30 kg) is required for supplying high power, so that there is a limitation on increasing a transportation available pure weight and an operation (flight) time of the unmanned flight vehicle is limited due to a limitation on an available power capacity, and as a result, the increase in the standard and the output of the unmanned flight vehicle has a large limitation in terms of a usage. Accordingly, there is a problem in that an operation of the unmanned flight vehicle becomes more difficult in a field for industry.

Further, currently, a quadrotor or an unmanned aerial vehicle uses a gasoline (diesel) engine or a secondary battery as a power supply device. A gasoline (diesel) engine electric generator has a problem with noise and air pollution and uses gasoline (diesel) as electric-generation fuel, so that there is a problem in that a weight of refueled gasoline (diesel) for a long-timed flight is increased. Further, the secondary battery has a problem in that it is difficult to operate the secondary battery for a long time due to a charging time and a capacity issue.

DISCLOSURE

Technical Problem

The present invention has been made in an effort to provide a hydrogen recycling flight system, in which a hydrogen fuel cell is combined to be linked with a water electrolysis device, hydrogen gas generated by the water electrolysis is used as flotation power of a flight vehicle or used as fuel of the hydrogen fuel cell to generate electricity, the generated electricity is used in the water electrolysis device, and the hydrogen gas used as the flotation power of the flight vehicle is controlled to be used as fuel of the hydrogen fuel cell, thereby increasing flight time and making the flight vehicle floating in the air with hydrogen gas glide by using gravity of the flight vehicle as thrust.

Technical Solution

The present invention relates to a hydrogen recycling flight system and includes: a flight fuselage which has at least one pair of wings at each of both sides of a body; a hydrogen gas balloon which is air-tightly connected to the flight fuselage; a hydrogen fuel cell which is connected with the hydrogen gas balloon and is installed outside or inside the flight fuselage; and a secondary battery which supplies fuel to the hydrogen fuel cell and is charged with electricity generated from the hydrogen fuel cell, electricity generated from a solar cell provided at an outer peripheral portion of the flight fuselage, or electricity of an external power network, in which by using a switch, the hydrogen fuel cell is switched to a water electrolysis device or the water electrolysis device is switched to the hydrogen fuel cell, the hydrogen recycling flight system includes: a water tank which stores water generated from the hydrogen fuel cell; the water electrolysis device which electrolyzes the stored water; a switch control device which switches functions of the hydrogen fuel cell and the water electrolysis device; and a high-pressure gas barrel which high-pressure stores hydrogen gas and oxygen gas generated in the water electrolysis device, and the flight fuselage flies by controlling the volume of the hydrogen gas balloon that is flotation power of a flight vehicle by an operation of the hydrogen fuel cell or the high-pressure gas barrel.

Advantageous Effects

According to the exemplary embodiment of the present invention, while an unmanned motor-driven flight vehicle which uses power consumes the large amount of power for floating the flight vehicle when flying in the air for a long time or transporting heavy freight, the present invention uses the hydrogen gas balloon for floating the flight vehicle, thereby more easily enabling the flight vehicle to float for a long time compared to the existing motor-driven flight vehicle.

According to the exemplary embodiment of the present invention, when power of a secondary battery or liquid fuel for generating power is exhausted, a flight vehicle cannot fly any longer, but in the present invention, it is possible to build a more efficient long-time flight system than an existing flight system by combining the hydrogen fuel cell, the water electrolysis device, the water tank, the high-pressure gas barrel, the secondary battery, the solar cell, and the like.

MODE FOR INVENTION

The foregoing object, characteristic, and advantage will be clearer through the following detailed description, and thus those skilled in the art may easily carry out the technical spirit of the present invention. Further, in describing the present invention, when it is determined that a detailed description of known technology related to the present invention unnecessarily obscures the subject matter of the present invention, the detailed description will be omitted.

Hereinafter, an exemplary embodiment according to the present invention will be described in detail with reference to the accompanying drawings.

First, a hydrogen recycling flight system according to an exemplary embodiment of the present invention will be described with reference to FIGS. 1 to 3.

Figure 1:
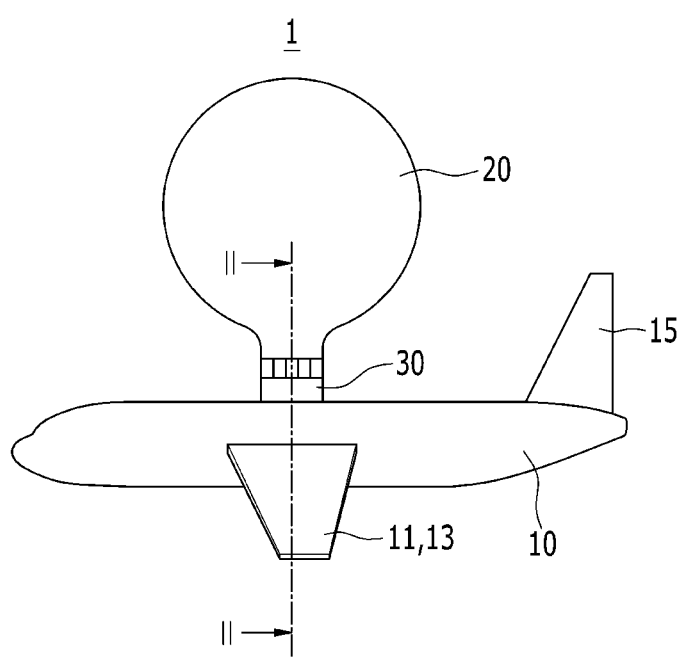
FIG. 1 is a schematic view for describing a hydrogen recycling flight system according to an exemplary embodiment of the present invention.
Figure 2:
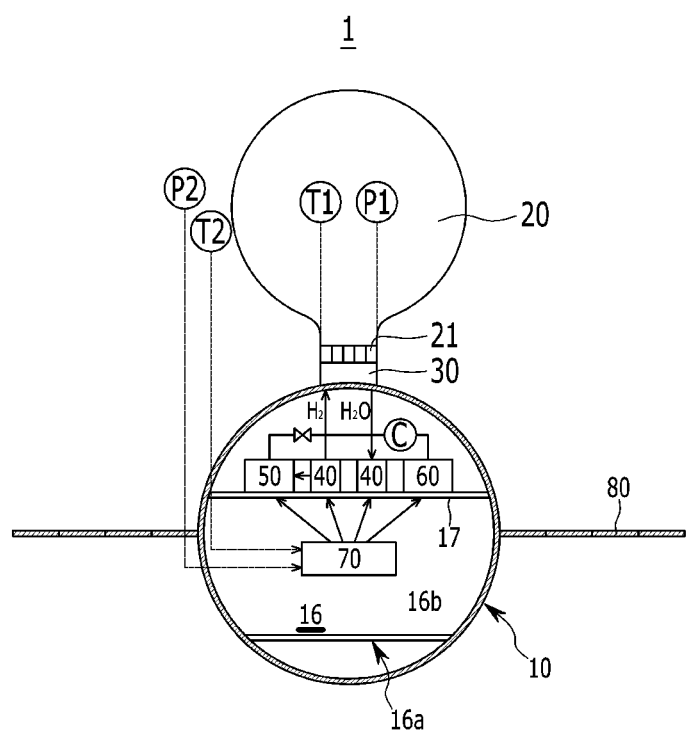
FIG. 2 is a cross-sectional view taken along line II-II of FIG. 1.

A hydrogen recycling flight system 1 illustrated in FIGS. 1 and 2 according to the exemplary embodiment of the present invention includes a flight fuselage 10 which is formed with an internal space 16 providing a space 16a for freight or an embarkation space 16b for people, a hydrogen gas balloon 20 which is air-tightly connected to an upper portion of the flight fuselage 10 in an upper direction and is charged with hydrogen gas, a hydrogen fuel cell 30 which is coupled to an entrance of the hydrogen gas balloon 20 by a sealing fastening part 21, is installed outside the flight fuselage 10 to easily exchange heat with the air, and uses waste heat for heating inside the flight fuselage 10 or reforming hydrogen gas, a high-pressure gas barrel 40 which is installed on a support fixture 17 suspended to an upper portion of the internal space of the flight fuselage 10 and supplies fuel to the hydrogen fuel cell 30, a water electrolysis device 50 which electrolyzes water that is a product of the hydrogen fuel cell 30 and generates hydrogen gas and oxygen gas that are fuel of the hydrogen fuel cell 30, and a secondary battery 60 which is used as power of the water electrolysis device 50 and is charged with electricity generated by the hydrogen fuel cell 30, electricity generated from a solar cell 80 installed at an outer peripheral portion of the flight fuselage 10, or electricity of an external power network.

The water electrolysis device 50 may not be a separate device different from the hydrogen fuel cell 30, and a function of the water electrolysis device 50 may be switched with a function of the hydrogen fuel cell 30 through a switch.

The flight fuselage 10 of FIG. 1 is formed in a streamlined shape, and has a pair of main wing 11 and auxiliary wing 13 at each of both sides of a body, and may further include a tail wing 15 including a vertical stable plate and a horizontal stable plate at a tail thereof.

In the hydrogen recycling flight system 1 according to the exemplary embodiment of the present invention, since the flight fuselage 10 may float by the hydrogen gas balloon 20, it is possible to decrease power consumption for floating a flight vehicle, unlike a flight vehicle using an internal-combustion engine, a rotor, or the like, and further, the hydrogen recycling flight system 1 may also be used for transporting a heavy object, such as people or freight.

Figure 3:
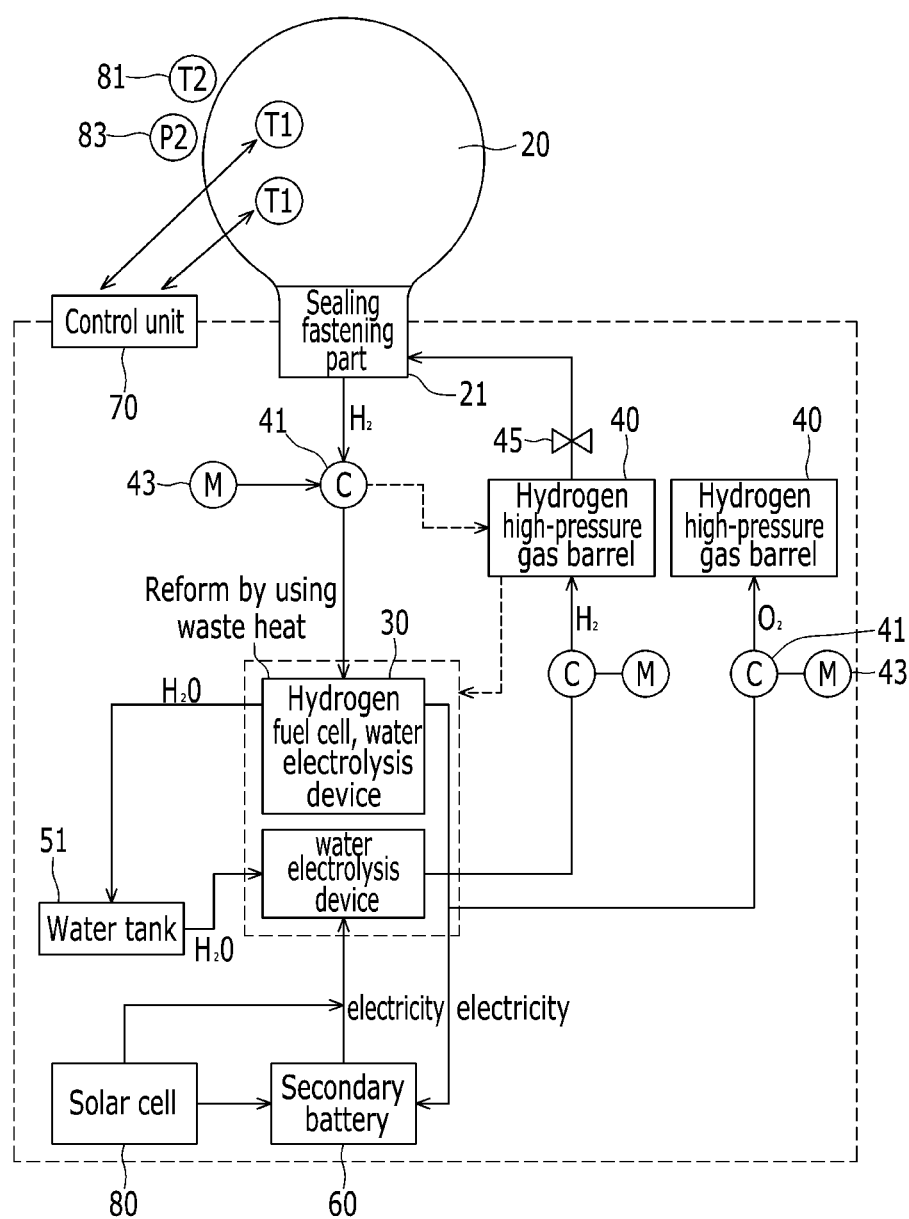
FIG. 3 is a block diagram for describing a configuration the hydrogen recycling flight system according to the exemplary embodiment of the present invention.

In the hydrogen recycling flight system 1 of FIGS. 2 and 3 according to the exemplary embodiment of the present invention, the amount of hydrogen gas within the hydrogen gas balloon 20 may be controlled, and to this end, first and second temperature sensors T1 and T2 and first and second pressure sensors P1 and P2 are provided inside and outside the hydrogen gas balloon 20, and a control device 70 communicating with the sensors may be further provided.

In FIG. 3, a compressor 41, an electric motor 43 operating the compressor 41, and a flow adjusting valve 45 opening/closing an opening of the high-pressure gas barrel 40 are connected between the high-pressure gas barrel 40 and the hydrogen gas balloon 20, and the compressor 41, the electric motor 43, and the flow adjusting valve 45 may be controlled by a control signal of the control device 70 based on measurement signals of the first and second temperature sensors T1 and T2 and the first and second pressure sensors P1 and P2 inside and outside the hydrogen gas balloon 20.

The compressor 41 sucks and compresses hydrogen gas charged in the hydrogen gas balloon 20, and the compressed hydrogen gas may be stored in the high-pressure gas barrel 40.

When the flow adjusting valve 45 is opened between the high-pressure gas barrel 40 and the hydrogen gas balloon 20, the high-pressure hydrogen gas is expanded and buoyancy of the hydrogen gas balloon 20 is increased due to an increase in volume by the expansion of the hydrogen gas, and the flight fuselage 10 may float by using the increased buoyancy as power.

The electric motor 43 may be driven by electric power generated by the hydrogen fuel cell 30 or the solar cell 80 or electricity charged in the secondary battery 60.

The control device 70 may control the operations of the hydrogen fuel cell 30, the water electrolysis device 50, and the secondary battery 60, as well as the operation of the electric motor 43.

Particularly, when the control device 70 detects an ascent of the flight fuselage 10 from the measurement signals of the first and second temperature sensors T1 and T2 and the first and second pressure sensors P1 and P2 inside and outside the hydrogen gas balloon 20, the control device 70 may operate the hydrogen fuel cell 30 to adjust the amount of hydrogen gas of the hydrogen gas balloon and maintain an altitude of the flight fuselage 10 by directly using hydrogen 20 gas of the hydrogen gas balloon 20 as fuel.

When it is necessary to rapidly decrease a volume of the hydrogen gas balloon 20, hydrogen gas may be sucked and compressed from the hydrogen gas balloon 20 through the compressor 41 by driving the electric motor 43, and the compressed hydrogen gas may be stored in the high-pressure gas barrel 40 as a matter of course.

When a temperature drops or atmospheric pressure increases, hydrogen gas of the hydrogen gas balloon 20 is contracted, so that buoyance is decreased and the flight fuselage 10 descends.

In this case, the control device 70 may make hydrogen gas from the high-pressure gas barrel 40 prevent the volume of the hydrogen gas balloon 20 from being decreased by gradually opening the flow adjusting valve 45, thereby maintaining a predetermined altitude of the flight fuselage.

When water is generated in the hydrogen fuel cell 30, the control device 70 stores the water in a water tank 51, makes the water hydrogen gas and oxygen gas by operating the water electrolysis device 50, and stores the hydrogen gas and the oxygen gas in the high-pressure gas barrel 40.

The control device 70 controls the hydrogen fuel cell 30 to generate electricity by using the hydrogen gas and the oxygen gas generated in the water electrolysis device 50 or oxygen gas in the outside air as fuel, and controls the generated electricity to be stored in the secondary battery 60 without directly using the generated electricity as flight thrust.

Unlike a disposable primary battery or the secondary battery 50 that is rechargeable several times, the hydrogen fuel cell 30 is a low-pollution and high-efficient next-generation energy source which is usable for a long time when a fuel gas barrel of the hydrogen fuel cell 30 is changed or charged without the separate power charge, and has a characteristic in that when the flight fuselage floats once in the air, the hydrogen fuel cell 30 enables the flight fuselage to fly for a long time.

The hydrogen fuel cell 30 has high system efficiency compared to other energy sources, and does not have a separate driving unit, thereby having no noise, and does not discharge harmful environment materials, such as sulfur and a nitrogen oxide, thereby being environmentally friendly.

The hydrogen fuel cell 30 is formed of two electrode bars adjoined to each other around an electrolyte, and when oxygen gas in the air passes one electrode and hydrogen gas passes the other electrode, heat is generated through an electrochemical reaction, in addition to electricity and water, so that the heat may be used for heating the flight fuselage 10 or reforming the hydrogen gas as described above.

Now, a flight mode of the hydrogen recycling flight system according to the exemplary embodiment of the present invention and a flight method will be described with reference to FIGS. 4 and 5.

Figure 4:
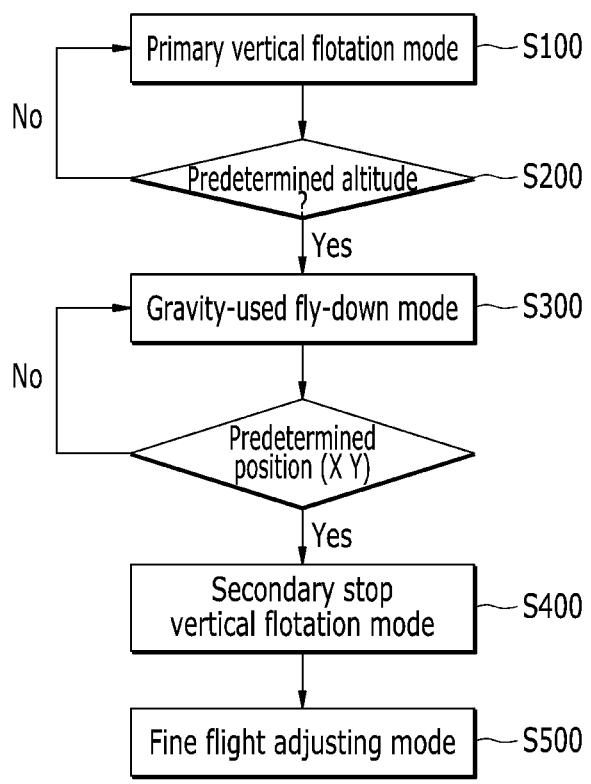
FIG. 4 is a flowchart for describing a flight mode of the hydrogen recycling flight system according to the exemplary embodiment of the present invention.

FIG. 4 is a flowchart for describing a flight mode of the hydrogen recycling flight system according to the exemplary embodiment of the present invention.

As illustrated in FIG. 4, the hydrogen recycling flight system 1 according to the exemplary embodiment of the present invention uses a primary vertical flotation mode S100 in which the flight fuselage 10 primarily vertically float to a predetermined altitude by the hydrogen gas balloon 20.

That is, the flow adjusting valve 45 between the high-pressure gas barrel 40 and the hydrogen gas balloon 20 is opened under the control to make high-pressure hydrogen gas be expanded and the hydrogen gas balloon 20 be expanded, thereby floating the flight fuselage 10 to the predetermined altitude by using buoyance as power.

Accordingly, the hydrogen recycling flight system 1 according to the exemplary embodiment of the present invention may decrease power consumption unlike the flight vehicle using an internal combustion engine, a rotor, or the like, and may also be environmentally-friendly used for transporting an object, such as people or freight.

In the meantime, the control device 70 determines whether the altitude of the hydrogen gas balloon 20 is the predetermined altitude (S200), and when it is determined that the altitude of the hydrogen gas balloon 20 is the predetermined altitude, the hydrogen recycling flight system 1 according to the exemplary embodiment of the present invention provides a gravity-used fly-down mode S300 in which the predetermined amount of hydrogen gas charged in the hydrogen gas balloon 20 is sucked and compressed by using the compressor 41, the compressed hydrogen gas is stored in the high-pressure gas barrel 40, and the flight vehicle may freely fly down by using gravity and fly to a predetermined position without energy consumption.

The hydrogen recycling flight system 1 according to the exemplary embodiment of the present invention may fly down to a predetermined position by using the pair of main wing 11 and auxiliary wing 13 at each of both sides of the body.

When it is detected that the flight vehicle flies to the predetermined position, in order to prevent the flight vehicle from dropping, the hydrogen recycling flight system 1 according to the exemplary embodiment of the present invention proceeds to a secondary stop vertical flotation mode S400 in which high-pressure hydrogen gas is expanded and the hydrogen gas balloon 20 is expanded to increase buoyance by opening the flow adjusting valve 45 between the high-pressure gas barrel 40 and the hydrogen gas balloon 20 under the control, and the altitude of the flight fuselage 10 may be prevented from being lowered any longer by using the increased buoyance as power.

In this state, the hydrogen recycling flight system 1 according to the exemplary embodiment of the present invention may use a fine flight adjusting mode S500 by using the pair of main wing 11 and auxiliary wing 13 at each of both sides of the body, and the tail wing 15 formed at the tail of the body in order to make the flight fuselage fly to a target position.

The main wing and the auxiliary wing may be a variable type in which the wing is foldable and unfoldable in order to improve floating efficiency in the primary vertical flotation mode.

Now, a hydrogen recycling flight method according to an exemplary embodiment of the present invention used together with the flight mode of FIG. 4 will be described with reference to FIG. 5.

Figure 5:
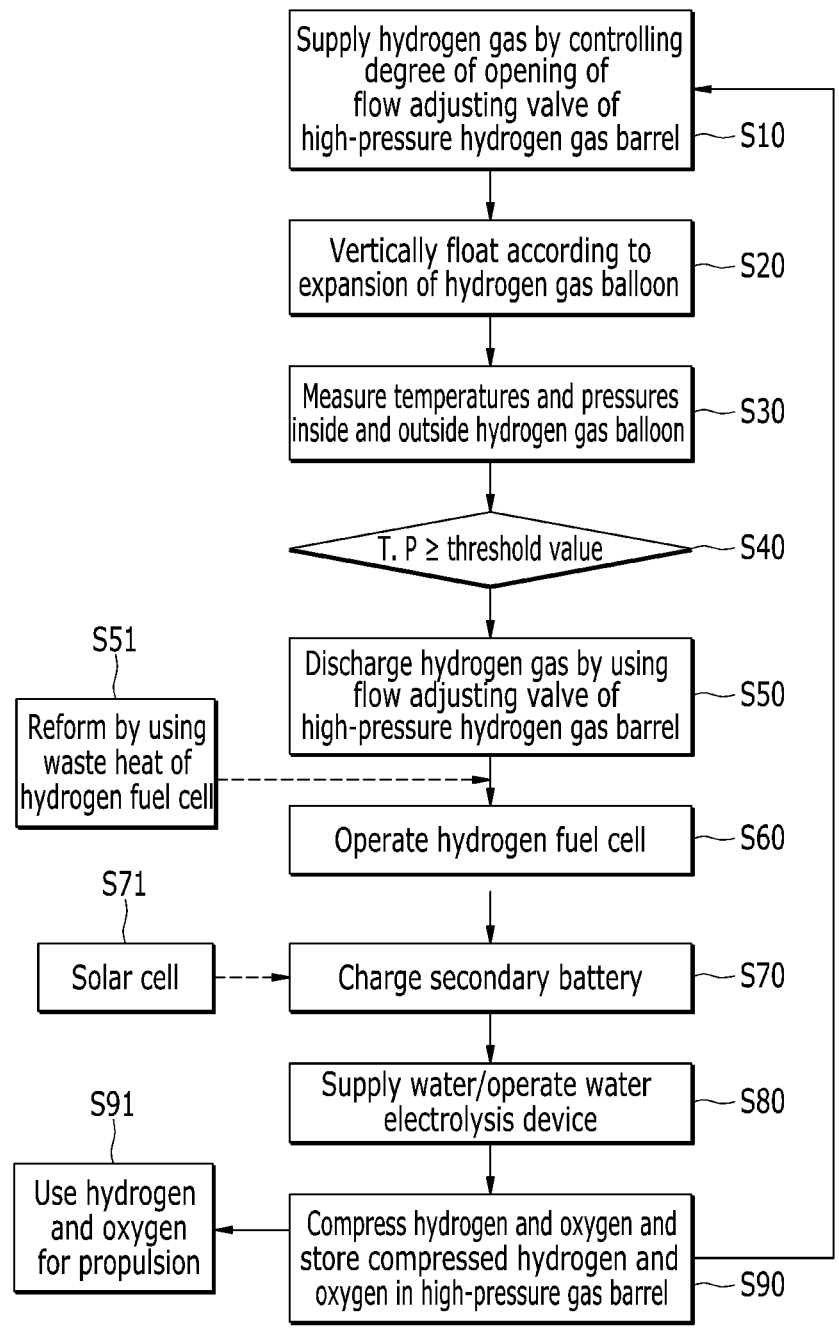
FIG. 5 is a flowchart for describing a hydrogen recycling flight method according to an exemplary embodiment of the present invention.

FIG. 5 is a flowchart for describing a hydrogen recycling flight method according to an exemplary embodiment of the present invention.

In the hydrogen recycling flight system 1 according to the exemplary embodiment of the present invention, the control device 70 expands the hydrogen gas balloon 20 with high-pressure hydrogen gas by opening the flow adjusting valve 45 between the high-pressure gas barrel 40 and the hydrogen gas balloon 20 (S10).

Buoyance is increased compared to gravity of the flight vehicle by the expansion of the hydrogen gas balloon 20, thereby vertically floating the flight fuselage 10 by using the increased buoyance as power (S20).

In this case, the control device 70 measures inside and outside temperatures and pressures of the hydrogen gas balloon 20 by using the first and second temperature sensors T1 and T2 and the first and second pressure sensors P1 and P2 inside and outside the hydrogen gas balloon 20 (S30).

It is determined whether the temperatures and the pressures are equal to or larger than threshold values (S40).

When the temperatures and the pressures are equal to or larger than the threshold values, it is recognized that an altitude of the flight fuselage 10 is a critical altitude of the increase, and for example, when the flight fuselage 10 flies higher, it is recognized that the flight fuselage 10 is at a point at which the hydrogen gas balloon 20 may be exploded, and the hydrogen gas is sucked and compressed from the hydrogen gas balloon 20 through the compressor 41 by driving the electric motor 43 and the compressed hydrogen gas is stored in the high-pressure gas barrel 40 (S50).

In the meantime, the altitude of the flight fuselage is maintained by adjusting the amount of hydrogen gas of the hydrogen gas balloon by directly using the hydrogen gas of the hydrogen gas balloon 20 as fuel of a hydrogen fuel cell by operating the hydrogen fuel cell 30 (S60).

Moisture may also be evaporated and reformed by heating hydrogen gas supplied through the hydrogen gas balloon 20 by using waste heat generated in the hydrogen fuel cell 30 (S51).

The control device 70 controls the secondary battery 60 to be charged with electricity generated in the hydrogen fuel cell 30 (S70).

As a matter of course, the secondary battery 60 may be charged from the solar cell 80 installed on the outer peripheral surface of the flight fuselage 10 or hydrogen gas and oxygen gas may be stored in the high-pressure gas barrel 40 by directly operating the water electrolysis device (S71).

When water is generated in the hydrogen fuel cell 30, the control device 70 stores the water in the water tank 51, or makes the water hydrogen gas and oxygen gas by operating the water electrolysis device 50 (S80), and stores the hydrogen gas and the oxygen gas in the high-pressure gas barrel 40 (S90).

As described above, the hydrogen gas stored in the high-pressure gas barrel 40 may be used as power floating the hydrogen gas balloon 20, and the stored high-pressure oxygen gas may also be used as a flight propulsion material depending on a case (S91).

In summary, according to the hydrogen recycling flight method according to the exemplary embodiment of the present invention, the hydrogen gas between the hydrogen gas and the oxygen gas generated by the water electrolysis device 50 is used as flotation power of the flight vehicle, the hydrogen fuel cell 30 generates electricity by using the generated hydrogen gas and oxygen gas or oxygen gas in the air as fuel, and the generated electricity is stored in the secondary battery 60, so that hydrogen gas and oxygen gas may be continuously generated by using the stored electricity as power of the water electrolysis device 50, and only when fuel, that is, hydrogen gas, is continuously supplied, the hydrogen fuel cell 30 may be used for a long time, and the hydrogen fuel cell 30 has higher system efficiency than that of other energy sources, and does not have a separate driving unit, causing no noise, and does not discharge harmful environmental materials, such as sulfur and a nitrogen oxide, thereby being environmentally friendly.

INDUSTRIAL APPLICABILITY

The foregoing exemplary embodiments have been described for illustrative purposes, and those skilled in the art will appreciate that various changes and modifications are possible without departing from the scope of the essential characteristic of the present invention. Therefore, the exemplary embodiments disclosed in the present invention are intended not to limit but to describe the technical spirit of the present invention, and the range of the technical spirit of the present invention is not limited by the exemplary embodiment. The scope of the present invention shall be construed on the basis of the accompanying claims in such a manner that all of the technical ideas included within the scope equivalent to the claims belong to the present invention.

The invention claimed is:

1. A hydrogen recycling flight system, comprising:
   a flight fuselage which has at least one pair of wings at each of both sides of a body;
   a hydrogen gas balloon which is air-tightly connected to the flight fuselage;
   a hydrogen fuel cell which is connected with the hydrogen gas balloon and is installed outside or inside the flight fuselage;
   a water tank which stores water generated in the hydrogen fuel cell;
   a water electrolysis device which electrolyzes the water stored in the water tank;
   a high-pressure gas barrel which supplies fuel to the hydrogen fuel cell and high-pressure stores hydrogen gas and oxygen gas generated in the water electrolysis device; and
   a secondary battery which is charged with electricity generated from the hydrogen fuel cell or electricity of an external power network,
   wherein a volume of the hydrogen gas balloon is controlled by an operation of the hydrogen fuel cell or the high-pressure gas barrel.

2. The hydrogen recycling flight system of claim 1, wherein:
   the flight fuselage has a freight accommodation space or an embarkation space inside thereof and vertically floats by buoyance of the hydrogen gas balloon.

3. The hydrogen recycling flight system of claim 1, wherein:
   the flight fuselage includes an object for a space for transporting freight outside thereof.

4. The hydrogen recycling flight system of claim 3, further comprising:
   a fixing device which connects the object for transporting freight to an aboveground part by a wire; and
   a lifting device and a control device which lift the object for transporting freight.

5. The hydrogen recycling flight system of claim 3, further comprising:
   a falling device and a control device which fall down the object for transporting freight to the aboveground part.

6. The hydrogen recycling flight system of claim 1, wherein:
   a solar cell is further installed at an outer peripheral portion of the flight fuselage or the hydrogen gas balloon, and electricity generated from the solar cell is charged in the secondary battery or directly operates the water electrolysis device to store hydrogen gas and oxygen gas in the high-pressure gas barrel.

7. The hydrogen recycling flight system of claim 4, wherein:
   an electric wire is attached to the wire connecting the object for transporting freight to the aboveground part to charge the secondary battery.

8. The hydrogen recycling flight system of claim 1, further comprising:
   a control device which switches the hydrogen fuel cell to the water electrolysis device and the water electrolysis device to the hydrogen fuel cell in the hydrogen fuel cell and the water electrolysis device.

9. The hydrogen recycling flight system of claim 1, further comprising:

first and second temperature sensors and first and second pressure sensors which are installed inside and outside the hydrogen gas balloon for controlling the amount of hydrogen gas of the hydrogen gas balloon; and a control device which controls a volume of the hydrogen gas balloon, the hydrogen fuel cell, the water electrolysis device, and the secondary battery by using temperatures and pressures measured by the first and second temperature sensors and the first and second pressure sensors.

10. The hydrogen recycling flight system of claim 9, wherein:

the control device controls the degree of opening of a flow adjusting valve connected between the high-pressure gas barrel and the hydrogen gas balloon.

11. The hydrogen recycling flight system of claim 1, wherein:

the hydrogen fuel cell generates electricity by using the hydrogen gas and the oxygen gas stored in the high-pressure gas barrel or oxygen gas in the outside air as fuel.

12. The hydrogen recycling flight system of claim 1, wherein:

the oxygen gas stored in the high-pressure gas barrel is used as a propulsion material for accelerating a flight vehicle, and the propulsion material is spurted by adjusting a spurt direction of the propulsion material to a direction appropriate to flight.

13. The hydrogen recycling flight system of claim 1, further comprising:

a variable wing which is foldable and unfoldable in order to improve floating efficiency of the flight system.

* * * * *